United States Patent
Chu

(10) Patent No.: US 6,377,201 B1
(45) Date of Patent: Apr. 23, 2002

(54) RADAR AND METHOD THEREFOR

(75) Inventor: Adam Ning Chu, Colorado Springs, CO (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/089,340

(22) Filed: Jun. 3, 1998

(51) Int. Cl.$^7$ .......................... G01S 13/88; G01S 13/89
(52) U.S. Cl. ................... 342/22; 342/21; 342/118; 342/134; 342/175; 342/176; 342/179; 342/190; 342/191; 342/195
(58) Field of Search ....................... 342/21, 22, 25, 342/134, 175, 176, 179, 190, 191, 192, 193, 195, 118; 356/27, 28

(56) References Cited

U.S. PATENT DOCUMENTS

| | | | |
|---|---|---|---|
| 4,430,653 A | * | 2/1984 | Coon et al. ............... 342/22 |
| 5,113,192 A | | 5/1992 | Thomas |
| 5,325,095 A | | 6/1994 | Vadnais et al. |
| 5,337,053 A | * | 8/1994 | Dwyer ................. 342/22 X |
| 5,384,715 A | | 1/1995 | Lytton |
| 5,420,589 A | * | 5/1995 | Wells et al. ............. 342/22 |
| 5,457,394 A | | 10/1995 | McEwan |
| 5,499,029 A | | 3/1996 | Bashforth et al. |
| 5,673,050 A | | 9/1997 | Moussally et al. |
| 5,704,142 A | | 1/1998 | Stump |

OTHER PUBLICATIONS

Hermes: A high–speed radar imaging system for inspection of bridge decks, Azevedo et al., Oct. 23, 1996, International Society For Optical Engineering; Scottsdale, AZ.

\* cited by examiner

*Primary Examiner*—Bernarr E. Gregory
(74) *Attorney, Agent, or Firm*—Sidley Austin Brown & Wood LLP

(57) ABSTRACT

A radar (300) comprises a transceiver (302) for transmitting pulses directed to a subsurface area of interest (102) and for receiving a reflected wave (210) from the subsurface area of interest. The pulses have a pulse duration and amplitude constrained by the equation, $d^2|E|e/m \leq 1$ Angstrom, where d is the pulse duration in seconds, E is the pulse amplitude in volts/meter, e equals the charge of an electron in Coulombs, and m equals the mass of an electron in Kg. A processing device (304), in communication with the transceiver, processes the reflected wave and displays an image of the subsurface area of interest and identifies the material composition of subsurface objects that have known properties that vary as a function of the pulse duration and amplitude.

35 Claims, 4 Drawing Sheets

RADAR AND METHOD THEREFOR

FIELD OF THE INVENTION

The present invention relates generally to the field of imaging and materials identification, and, more particularly, to a radar for imaging a subsurface area of interest and for classifying the material composition of subsurface objects, and a method therefor. Although the present invention is subject to a wide range of applications, it is especially suited for use in a ground-penetrating radar (GPR) system radar, and will be particularly described in that connection.

BACKGROUND OF THE INVENTION

GPR uses radio waves to detect buried objects in nonmetallic material and can penetrate soils, rock, and manmade structures. GPR is used to map the interior of objects penetrable by radio waves, similar to the way X-rays can image the inside of a human body. It us used to discriminte metallic and nonmetallic materials, utility lines, voids, bed rock layers, rebar spacing, concrete floor thickness, and other subsurface anomalies or debris.

The depth of exploration and image definition depend on the radio frequency (RF) used. Low frequencies are used for deep geological mapping. High frequencies are used for high definition imaging.

A typical ground-pulse radar (GPR) system for investigating a subsurface area of interest is shown in FIG. 1.

The function of the transmitter 204 is to generate a known waveform of RF energy to probe the subsurface area of interest 102. This energy waveform is typically a sinusoidal pulse, 0.5 to 2.0 nanoseconds seconds in duration. Use of such a narrow pulse improves the GPR systems ability to distinguish small subsurface features while simultaneously limiting the depth to which it can probe.

The narrow pulse formed by transmitter 204 is routed to an antenna 202 where it is radiated into the subsurface area of interest 102. For ease of illustration and explanation, the subsurface area of interest 102 is shown as a multilayer system. One of ordinary skill will appreciate that the thickness of the layers can be varied as well as the shape of the layers. As the electromagnetic pulse leaves the antenna it becomes a transmitted signal 209, traveling though free air until it strikes the first surface 102. A fraction of the transmitted signal 209 passes through the first surface and a fraction is reflected in other directions away from the air-first surface interface as shown in element 210A. The process of signal transmission and reflection is repeated at each layer-layer interface as the transmitted signal 209A continues to propagate into the subsurface area of interest. At each interface the transmitted portion of the signal becomes weaker as indicated by the relative widths of signals 209B and 209C.

Layers within the subsurface area of interest are defined in terms of their electromagnetic properties such as their dielectric constant. Thus, any time two materials with different electromagnetic properties abut, there will be an interface between them that affects the transmission of a propagating RF signal.

During RF pulse transmission, an isolator 203 connects the transmitter 204 to the antenna 202. Shortly after transmission, the isolator 203 breaks this connection, making a connection between the antenna 202 and receiver 205. The function of the isolator 203 is to protect the receiver's 205 input components from damage from the high energy output of the transmitter 204.

Using one antenna for both RF pulse transmission and reception of a reflected signal 210 is called monostatic operation. If two antennas are used, one for transmission and one for reception, the operation is called bistatic. Both systems are functionally and structurally equivalent.

The task of the receiver 205 is to capture weak reflected signals 210A–C and amplify them for subsequent processing. Following reception, the captured and amplified reflected signal are passed to a signal processor 206. The specific signal processing performed depends upon the primary application of the GPR system but would, in almost all cases, include digitization so that the received signal could be placed in a digital storage device 207.

The final GPR system component is the display unit 208, the purpose of which is to present the reflected signal in a format useful to the human operator. The display unit 208 is typically a CRT screen or computer monitor. Typically, a processing unit (not shown) will analyze the digitized reflected wave signal before displaying it.

Ground-penetrating radar works according to a pulse-echo principle of clocking the two-way time of flight of an electromagnetic pulse. This type of ground-penetrating radar is called impulse radar because an unmodulated or baseband pulse is radiated rather than the usual sinusoidal burst found in conventional radar. The pulses are a sequence of impulses; there is no carrier. There is no specific frequency associated with this radar; rather, its frequency spectrum is related by the Fourier transform of the pulse. In conventional impulse radar, the free-space radiated pulse is a Gaussian-shaped impulse about 200 picoseconds wide.

A major advantage to impulse radar is that its spectrum has frequency components located close to DC, where attenuation of the signal amplitude by the medium it traverses is the lowest. For example, for the case where the transmitted signal wave front is planar with respect to a flat surface, the propagation of a transmitted wave in a homogeneous medium along the axis perpendicular to the flat surface has its signal amplitude governed by the equation:

$$E = E_0 e^{-\alpha z} e^{-j\beta z}, \qquad (1)$$

where $E_0$ is the amplitude of the electric field vector in volts/meter, z is the distance along the direction of propagation in meters, and $\alpha$ is a frequency-dependent attenuation parameter and $\beta$ is a frequency-dependent phase parameter related to the two material properties magnetic permeability ($\mu$) and permittivity ($\in$) in Farads/meter.

Equation (1) indicates that 1) the magnitude of the electric field of the transmitted signal, E, decreases as it propagates into the homogenous medium and 2) that its pulse shape is distorted because of the nonlinear phase term, $\beta z$.

While the assumptions do not hold in the strictest sense, standard practice in GPR analysis holds that they are acceptable simplifications for purposes of field use and theoretical development.

A GPR pulse propagating inside the subsurface area of interest 102 will undergo transmission and reflection events whenever it encounters an interface between different layers. The propagation impedance in free space is governed by the following equation:

$$Z_0(\text{space}) = \sqrt{(\mu_0/\in_0)} \qquad (2)$$

The propagation impedance in a material (wood) having $\in_r = 2$ is governed by the following equation:

$$Z_r(\text{wood}) = \sqrt{(\mu_0/\in_r\in_0)} = Z_0(\text{space})/\sqrt{(\in_r)} = Z_0(\text{space})/\sqrt{2} \qquad (3)$$

The free space propagation impedance is 377 ohms and the propagation impedance of wood is 266 ohms. This difference in impedance causes a difference in the reflection magnitude at the air-wood interface.

In a one dimensional analogy to propagation along a transmission line, which can be equated to time domain reflectometry (TDR), reflections off the wood layer become equivalent to reflections from a transmission line discontinuity. The reflection coefficient, R, defined as (Y−1)/(Y+1) where Y=Z(wood)/Z(space), can be applied to determine what fraction of the radiated pulse is returned.

For example, wood with an $\in_r=2$, the reflection magnitude, relative to 377 ohms, is 0.17. Thus the difference in reflection magnitude between the presence and absence of a wood layer is 0.17. If the layer were metal, the reflection would be total, or 1.0. Thus, metal is easily discerned from wood by a 5.9 times greater reflection magnitude.

The parameters which determine the amount of energy that is reflected (away from the signal's direction of travel) and transmitted (through to the next layer) are known as reflection (R) and transmission (T) coefficients respectively. The amplitude of the reflected ($E_r$) and transmitted ($E_t$) electric fields, for the "$n^{th}$" layer, can be expressed in terms of these coefficients in the following manner:

$$E_r(n)=R(n)E_i(n), \tag{4}$$

$$E_i(n+1)=T(n)E_i(n), \tag{5}$$

where $E_r(n)$ is the magnitude of the reflected electric field at the $n^{th}$ interface, $E_i(n)$ is the magnitude of the electric field incident to the $n^{th}$ interface, and $E_i(n+1)$ is the magnitude of the electric field transmitted through to the $n^{th}$ layer in a multilayer system. Only the electric field is considered here because the typical GPR receiver detects and processes only voltage waveforms.

The effect of reflection and transmission events on the transmitted signal 209 can be seen in FIG. 2. As the transmitted signal 209 encounters each layer in the subsurface area of interest 102, a small portion of its energy is reflected back to the receiver 205. (Reflected signal 210 is a combination of reflected signals 210A, 210B, and 210C; temporally superimposed.) The resulting received signal 210 shows a series of peaks which denote layer-layer reflection events. Successive peaks are smaller and smaller and signify the attenuation (parameter α in equation (1)) of the transmitted signal 209 as it propagates deeper into the multiayer system and the loss of energy due to reflections.

Operation is based on emitting a pulse from a transmit antenna, waiting for a brief period of time corresponding to the round trip time of flight at the speed of light, and then opening a gate connected to a receive antenna to allow the reflected pulse to be sampled. This process is typically repeated at a 1 MHz rate, allowing approximately 10,000 receive pulses to be averaged prior to driving a signal intensity display. The high level of averaging reduces the random noise accompanying the sampled signal to such an extent that extremely low amplitude signals can be detected.

Extraction procedures can be used to quantify key characteristics of the reflected radar signal which describe features of the subsurface area under study. For example: 1) the number of peaks in a reflected signal indicates the number of layers comprising the subsurface area, 2) the ratio of reflected signal peaks (210A, 210B, and 210C) provide information regarding the dielectric constant of the different layers within the subsurface area, and 3) the time between peak values can be used to determine the thicknesses of the different layers within the subsurface area. With this information, an image of the subsurface area, including objects within the subsurface area, can be constructed and displayed Another technique is to model mathematically the propagation and reflection of an RF pulse in a subsurface area. Such a model generates a "predicted" or "synthetic" reflection signal. In this method, parameters such as layer thickness and dielectric constant are estimated. These estimates are then input to the model which calculates a synthetic signal. Parameter estimates are adjusted until there is a sufficiently good match between the reflected and synthetic signals. The final (model) values for layer thickness and dielectric constant are taken as the extracted measures.

Since the mid-1970s work has progressed towards the development of penetrating radars, mainly for geological purposes and applications. In order to refine the resolution of the earlier radars, increased power was applied, which then gave spurious reflections and images, complicating the analysis of the imagery received. This methodology received lukewarm support from many of other potential users.

Currently, many types of RF and seismic devices are used to provide imaging of underground structures and objects. However, existing imaging technologies suffer from expensive instrumentation, complex procedures, and poor resolution. In addition, the existing technologies degrade to incomprehensible imagery when operated in harsh environmental conditions (e.g., rain, snow, etc.).

In the area of medical imaging, there are many technologies (e.g., X-ray, MMI, MRI, CAT) using classical techniques of varying effectiveness and applications. Much of this equipment is very expensive which limits accessibility, and the imagery can be difficult to interpret. The patient, too, is often subject to very uncomfortable procedures, and, depending upon the technology, also subject to potentially hazardous side effects.

In the area of communications, existing technologies are limited in penetrating large barriers, such as mountains or oceans, or large, dense man-made structures. Relay stations, repeaters, and certainly communications satellites drive up the cost and complexity of communications—and the proliferation of such technology is continually increasing the ambient Radio Frequency Interference within the radio spectra as well as diminishing the available frequencies for new users. All these add to cost and increasing dependence on complex frequency and power management.

Many of these concerns are being addressed, but with classical approaches and indifferent results. While there have been many development efforts over the past 20 years, each has consistently displayed one or more the following functional or operational limitations: (a) limited power with very short range capabilities (e.g., proximity sensors), (b) unobserved or misunderstood capabilities to penetrate metals or sea water, (c) inability to obtain high-resolution images of deeply buried objects, (d) inability to consistently detect and discriminate targets under harsh environmental conditions (e.g., rain, snow), and (e) inability to perform discrimination of various material compositions.

A major drawback of conventional impulse radar systems is their inability to penetrate good conductors, such as sea water or metals. Using traditional theory it is considered impossible to penetrate good conductors using electromagnetic radiation. Thus, the interior of a metal-cased enclosure can not be explored and its contents identified. The ability to penetrate such enclosures can be of great benefit in detecting potentially hazardous contents of steel drums, discriminating live land mines from rocks or other clutter, discriminating spent ammunition casings from live ammunition, etc.

Recently scientists and experimenters have begun to measure the increased penetration of ultra-narrow-pulse (UNP) electromagnetic energy, surprisingly through good conductors. To date, the anomalous penetration capabilities of UNP electromagnetic waves has not been explained.

Maxwell's equations assume steady-state transfer of energy from the electromagnetic field into material. The traditional approach to this problem has been to statistically measure overall electromagnetic properties as a function of frequency. Materials penetrated by ultranarrow impulses, however, do not follow Maxwell's equations; consequently, the extraction procedures and model generation techniques used with conventional impulse radars do not work well to discriminate materials and image subsurface areas.

A need therefore exists for a radar, and method therefor, that predictably and controllably penetrates various kinds of materials including metals, produces images of structures or objects buried or behind barriers, and identifies the material composition of the structures or objects.

SUMMARY OF THE INVENTION

The present invention, which tends to address this need, resides in a radar and method therefor. The radar described herein provide advantages over known ground-penetrating radars in that it, among other things, (a) achieves a much longer range, (b) produces high-definition imagery of deeply buried objects, (c) penetrates metals and seawater, (d) operates under harsh environmental conditions, and (e) performs discrimination of materials.

According to the present invention, a transceiver transmits pulses with a pulse duration and amplitude constrained by the equation, $d^2|E|e/m \leq 1$ Angstrom; where d is the pulse duration in seconds, E is the pulse amplitude in volts/meter, e equals the charge of an electron in Coulombs, and m equals the mass of an electron in Kg (e/m is the charge-to-mass ratio of an electron). A processing device provides an output representing an image of a subsurface area of interest based upon the reflected wave.

In accordance with one aspect of the present invention, the processing device controls the selection of the pulse duration and amplitude to enhance the image of a subsurface area of interest.

In accordance with still another aspect of the present invention, the pulses are in the radio-frequency range or in the laser-frequency range of the frequency spectrum or are coherent electromagnetic radiation.

In further accordance with the present invention, the processing device provides an output representing an identification of the material composition of a plurality of subsurface objects based upon the reflected wave and known properties of the plurality of subsurface objects that vary as a function of the pulse duration and amplitude.

In accordance with another aspect of the present invention, the pulse duration and amplitude are controlled to enhance the identification of the material composition of a plurality of subsurface objects.

In accordance with still another aspect of the invention, the known properties include permittivity, permeability, phase shift, and delay.

Other features and advantages of the present invention will be set forth in part in the description which follows and accompanying drawings, wherein the preferred embodiments of the present invention are described and shown, and in part become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DESCRIPTION OF THE PREFERRED EMBODIMENTS

Figure 1:
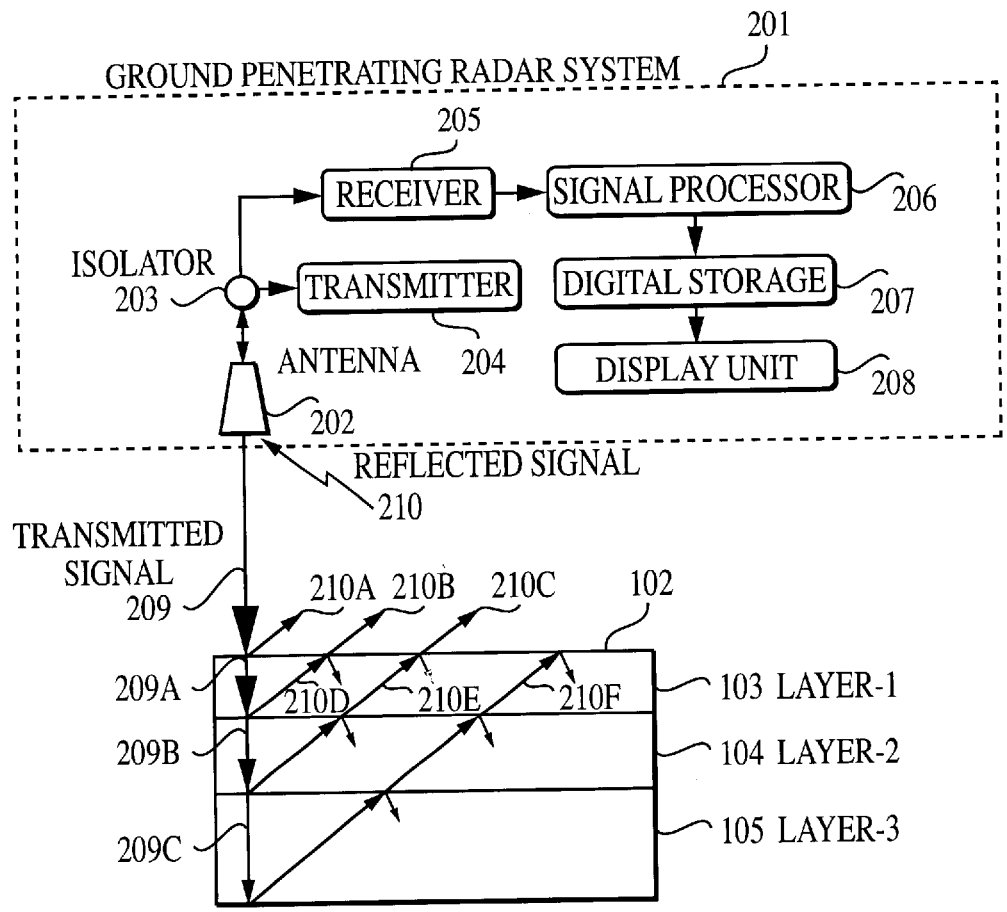
FIG. 1 is a functional block diagram of a conventional ground-penetrating radar system and an exemplary subsurface area of interest.
Figure 2:
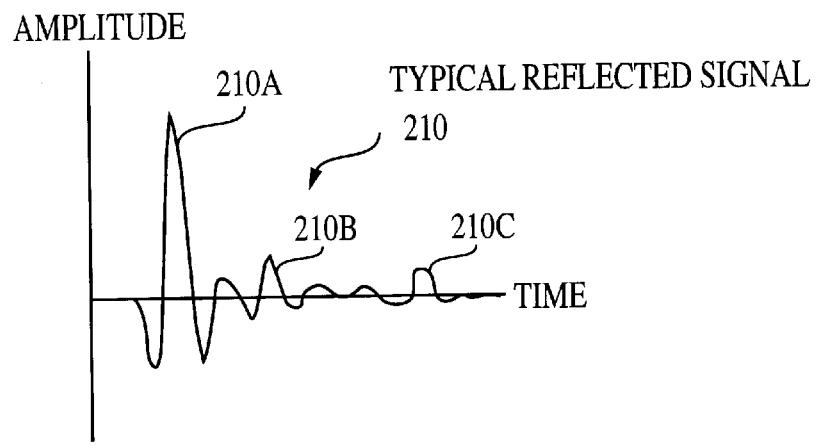
FIG. 2 is an exemplary amplitude-versus-time chart of a reflected wave shown in FIG. 1.

The inventor has overcome conventional thinking to explain and exploit the anomalous penetration of UNP electromagnetic waves. Historically, the approach has been to statistically measure overall electromagnetic properties as a function of frequency. While providing some data, very little understanding of the microscopic electromagnetic interaction is available or understood. There has not been any detailed description of the underlying physics accurate enough to support ultra-narrow pulse modeling.

The development of accurate models capable of determining the increased penetration characteristics of UNP electromagnetic waves require transient Maxwellian and quantum descriptions of the complex responsitivities of materials. An experimental and theoretical characterization system has been constructed in the laboratory and in the field to illuminate various materials with combinations of short pulse energies to determine the characteristics of the measured responses.

Classically, it is inconceivable that electromagnetic radiation can penetrate metals or seawater. In general, it is considered impossible to penetrate good conductors using electromagnetic radiation with very high frequency contents. The inventor has demonstrated that it is possible to penetrate good conductors with UNP electromagnetic waves and this confirms his theory for modeling the phenomenology of the increased penetration of ultra-narrow pulses.

Maxwell's equations assume steady-state transfer of energy from the electromagnetic field into the material. For electromagnetic energies well below quantum transition excitation energies, the energy loss mechanism is primarily due to excitations of free electrons in the conduction band of the materials. The number of induced collisions of the statistically large number of conduction electrons in good conductors in the presence of the electromagnetic field is large enough to substantiate steady-state assumptions. This condition is true for just about all the electromagnetic energies that are commonly encountered.

Recently scientists and experimenters have begun to measure the increased penetration of UNP electromagnetic energy. This is mainly due to the commercial availability of impulse generators, ultra-broadband antennas, and ultra-fast spectrum analyzers. However the inability to explain the underlying physics in the recent years has severely crippled the scientific community's ability to employ this technology.

The inventor has recognized that the steady-state assumption for material interactions is not true when the electromagnetic pulses become sufficiently short in duration. If the conduction electrons cannot be induced to collisions with bound atomic nuclei, then there is a minimum transfer of energy from the electromagnetic field. A Monte Carlo simulation indicates that for durations shorter than the time it takes to move an electron one Angstrom, the distance between atomic nuclei in dense matter, then the probability of induced collisions decreases exponentially.

The phenomenology of increased penetration of arbitrary media by ultra-narrow pulses is due to the very small response of the mobile electrons to the transient electromagnetic fields. If the mobile electron volumetric population cannot respond to the transient electromagnetic pulse so as to cause multiple collisions with nearby atoms, then the attenuation will be proportionally reduced. The phenomenology of reduced absorption of ultra-narrow electromagnetic pulses begins by considering the involved physics. A mobile electron moving under the influence of thermal forces (or collisions) must first respond to the electric field and accelerate. Then, through the mechanism of collisions with bound atoms, energy is transferred from the electric field. This effect characterizes the absorption mechanism. The findings and results for reduced absorption of ultra-narrow pulses is embodied in two key observations: 1) the electron's response to a very short rise time or fall time results in very small values of conductivity (or very small absorption), and 2) the probability of electron-atom collision is greatly reduced for a very short pulse resulting in very small values of conductivity.

The reduced probability of collision is estimated as follows. Assuming the results from solid state physics, since the size of an electron is much smaller than inter-atomic distances, a mobile electron can move appreciable distances before colliding with an atom. This is the concept of the calculable mean free path of a mobile electron in arbitrary media. The mean free path can be calculated following the principles and equations describing electron mobility in solid state physics.

The distance a mobile electron moves under the influence of an electric field is, $$d_e = |\Delta v| \Delta t, \quad (6)$$

where $d_e$ is the average distance that an electron travels under the influence of the electromagnetic field in meters, $\Delta v$ is the velocity of the electron caused by the electromagnetic field, and $\Delta t$ is the duration that the electromagnetic field is applied.

The velocity imparted to the electron during the interaction time duration is, $$|\Delta v| = \Delta t |E| e/m. \quad (7)$$

where E is the amplitude of the electromagnetic field in volts/meter, e equals the charge of an electron in Coulombs, and m equals the mass of an electron in Kg. Combining equations (6) and (7) and substituting d, the pulse duration, for $\Delta t$ leads to the result, $$d_e = d^2 |E| e/m. \quad (8)$$

The condition for penetration of good conductors is $d_e \leq$ one Angstrom. Using this constraint in equation (8) provides the theoretical basis that ultra-narrow pulses, with durations on the order of 100 picoseconds and rise and fall times on the order of tens of picoseconds, can propagate through arbitrary media with little energy loss.

For an assumed volumetric uniform distribution of mobile electrons, a probability for electron-atom collision can be proposed as, $$P = d_e / \text{classical mean free path}. \quad (9)$$

For ultra-narrow electromagnetic pulses, P will be much less than unity. For the purpose of illustration, consider the classical skin depth, 1/e or half-power material penetration distance, as the metric. The increased 1/e penetration is approximated by, $$\xi_{eff} = \xi / P, \quad (10)$$

where $\xi$ is the classical skin depth and $\xi_{eff}$ is the increased skin depth.

For example, a 20 picosecond 100 millivolt pulse, generated by a commercial generator, should penetrate one to ten mils of copper. The predicted transmission through the copper foil is one to two percent. The detectable signal should be between one to two millivolts. Because most of the conduction electrons are at the two surfaces of the copper foil, the attenuation in the interior of the copper foil is much smaller. Thus, there is only a small, but measurable difference between the transmission through the one mil and the ten-mil thick copper foils. Secondly, a phase delay should be seen as the pulse penetrates and propagates through the copper foil.

The predictions of the penetration of copper foils have been verified by the data collected by the inventor in a laboratory setting. Further experiments demonstrated the ability of the radar to penetrate and differentiate plexiglass, a sand-filled aquarium providing ten inches of a sand barrier, and a salt-water-filled aquarium.

The radar also detected objects behind barriers. Items that were detected in the laboratory included a metal can placed in an aquarium filled with sand, the back wall of a plastic box (the front wall being the barrier), the rear wall of a sheet rock wall, a copper foil placed four inches from the rear wall of a sheet rock wall, a plastic box placed behind the rear wall of a sheet rock wall, and a small copper target behind a four foot square copper barrier.

Furthermore, experiments were conduced outdoors to demonstrate a greater range than was possible in the laboratory and to show the ability to penetrate wet sand. A large sandbox with a platform for mounting the antennas and associated equipment was constructed. The platform allowed both rotation and tilt of the antennas. With this configuration, targets at distances of 36 inches to 72 inches from the antennas were observed. Additionally, targets that were placed under the sand to a depth of four inches were detected. Items that were detected in the sandbox included two plexiglass sheets, twelve inches in diameter and one-half-inch thick, spaced four inches apart, and buried in four inches of dry sand and alternately in wet sand.

Based on the above general equations, the permittivity, permeability, phase shift, and delay can be computed or empirically derived for different material compositions at varying pulse durations and amplitudes. The factors are unique to the inventor's approach. The permittivity, permeability, phase shift, and delay are not constant or only a function of frequency, but vary as a function of the pulse duration and amplitude of the ultra-narrow pulses. The permittivity, permeability, phase shift, and delay uniquely define the characteristics of the materials being penetrated and thus allow their identification. The factors also support 3-dimensional shaping and imaging of the materials as the individual components can be distinguished, including their depth. As materials are tested they are classified and stored in a relational database (properties database). The properties database supports rapid parsing, comparison, and materials classification in applications requiring near real-time response. Dynamic updates and additions of new materials can also be supported.

Accordingly, the radar (a) achieves a much longer range, (b) produces high-definition imagery of deeply buried objects, (c) penetrates metals and seawater, (d) operates under harsh environmental conditions, and (e) performs discrimination of materials.

Figure 3:
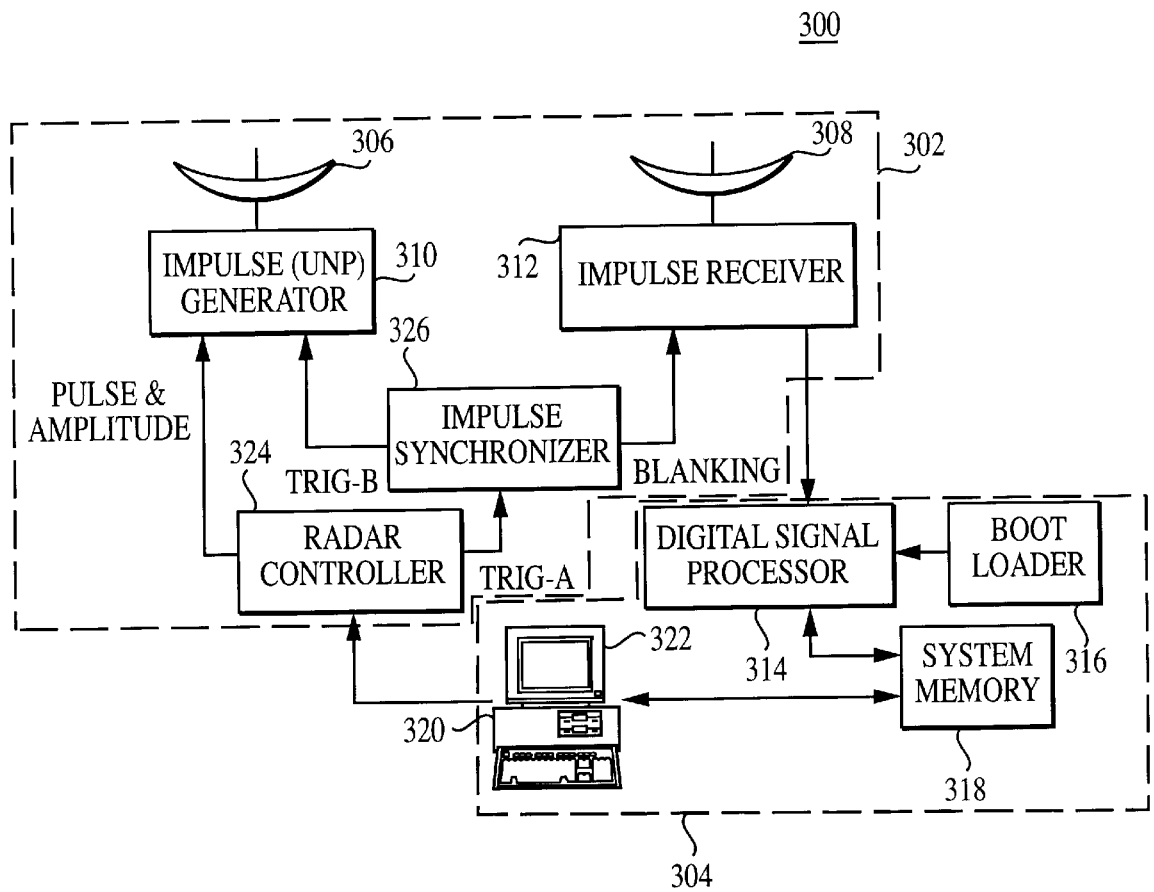
FIG. 3 is a functional block diagram of a radar configured according to one preferred embodiment of the present invention.

As shown in the exemplary drawings, and with particular reference to FIG. 3, which is a functional block diagram of a radar 300, the present invention comprises a transceiver 302 and a processing device 304 in communication with the transceiver 302. The radar can be used to explore a subsurface area of interest.

In this particular embodiment, transceiver 302 includes a transmit antenna 306 separate from a receive antenna 308. Using two antenna, one for transmission and one for reception is called bistatic operation. If one antenna is used for both pulse transmission and reception, the operation is called monostatic. Both operations are functionally and structurally equivalent.

Transceiver 302 further includes an impulse generator 310 for generating pulses. Impulse generator 310 can be a radio-frequency (electromagnetic) UNP generator. The sequence of ultra-narrow pulses are of variable pulse duration and amplitude. The pulses have a pulse duration and amplitude constrained by the equation, $d^2|E|e/m \leq 1$ Angstrom.

Transmit antenna 306 is in communication with impulse generator 310 and transmits the sequence of pulses directed to the subsurface area of interest. The subsurface area of interest can include a plurality of subsurface objects, e.g, land mines, rocks, spent ammunition shells, metal drums containing hazardous waste, etc.

Receive antenna 308 receives the reflected wave from the subsurface area of interest. Transceiver 302 also includes an impulse receiver 312 in communication with receive antenna 308. Impulse receiver 312 captures and amplifies the weak reflected wave received by receive antenna 308 for subsequent processing. Furthermore, coherent signal integration can be performed to maximize the amplitude of multiple pulse returns that are at or below the noise floor.

Processing device 304 includes a signal processor 314, a boot loader 316, a memory device 318, a processing unit 320, and a display device 322. Processing device 304 processes the reflected wave, provides an output representing an image of the subsurface area of interest or an identification of the material composition of the subsurface objects or both. Optionally, processing device 304 can display the image of the subsurface area of interest or the identification of the material composition of the subsurface objects or both.

Signal processor 314 is in communication with impulse receiver 312 and processes the reflected wave. The specific signal processing performed depends upon the primary application of the radar but would, in almost all cases, include digitization so that the received reflected wave could be placed in a storage device. A boot loader 316 is, in some signal processor devices, an external device used to program the signal processor operating parameters.

Memory device 318 is in communication with signal processor 314. The memory device can be, for example, dynamic random access memory. Although shown as a separate system memory in FIG. 3, a skilled artisan will recognize that the memory device can be incorporated in other components of radar 300, for example, processing unit 320, and that they are functionally and structurally equivalent.

Memory device 318 stores the processed reflected wave and the known properties of subsurface objects. The known properties of the subsurface objects stored in memory device 318 can be the permittivity, permeability, phase shift, and delay of each of the subsurface objects, which are theoretically or empirically derived, and are a fiction of the pulse duration and amplitude, among other things, such as, frequency.

Processing unit 320 is in communication with impulse generator 310, impulse receiver 312, and the memory device 318. Processing unit 320 controls the pulse duration and amplitude of the pulses, the transmission of the pulses, and the reception of the reflected wave. Processing unit 320 controls pulse repetition rate and pulse width to ensure sufficient data is obtained to image and classify the target. Dynamic software filtering can also be performed to provide discrete "binning" of the broadband input data. The discrete bins are then individually analyzed for signal content and classification, thus aiding more rapid data processing and target recognition. Processing unit 320 also provides an output based upon the stored processed reflected wave and the known properties of subsurface objects. The output can be derived using well-known range calculations, extraction procedures, and mathematical modeling, but substituting the steady-state electromagnetic properties of the subsurface objects with the novel electromagnetic properties that are a function of the pulse duration and amplitude, among other things. Accordingly, processing unit 320 provides the output based upon the stored processed reflected wave and the theoretically or empirically derived permittivity, permeability, phase shift, and delay associated with the underground objects that correspond to the particular pulse duration and amplitude of the sequence of transmitted ultra-narrow pulses.

Display device 322 is in communication with processing unit 320. Display device 322 displays the output provided by processing unit 320. For example, the displayed output can be an image of the subsurface area of interest or an identification of the material composition of the subsurface objects or both. The image can be, for example, displayed on a video monitor or displayed on a hard copy, such as, printer paper or photographic paper.

Transceiver 302 further includes a radar controller 324 and an impulse synchronizer 326. Radar controller 324 can be used, under control of processing unit 320, to set the transmit properties in terms of pulse width and amplitude and repetition rate. Synchronization between the generator and receiver can be performed using the generator's sync pulse or using separate commercially available devices.

In the illustrated embodiment of FIG. 3, the following commercially available items can be used for the various elements: impulse generator 310 can be an appropriately configured Pico Pulse Laboratories Model 4015C Pulse Generator, Pico Pulse Laboratories Model 5208 Pulse Forming Network, Pico Pulse Laboratories Model 5210 Pulse Forming Network, Pico Pulse Laboratories Model 5928 Broadband Amplifier, Pico Pulse Laboratories Model 4015 RPH Remote Pulse Head, and 40 GHz semi-rigid coaxial waveguide; impulse receiver 312 can be an appropriately configured Hewlett Packard Model 54750A Broadband Oscilloscope, Hewlett Packard Model 54752 50 GHz Broadband module, and 40 GHZ semi-rigid coaxial waveguide; transmit antenna 306 and receive antenna 408 can be Ultra-Broadband Antennas available from AEL/Tracor or TEM horn arrays with a Rexolite™ lens; processing unit 320, display device 322, and memory device 318 can be a desktop computer; signal processor 314 can be any one of a many commercially available broadband (>40 GHz) signal processors capable of handling processing requirements of the received signal. Furthermore, the Pico Pulse Laboratories pulse generator can synchronize the oscilloscope sweep for precise range measurements.

One illustrative embodiment of a method in accordance with the invention is described in some detail below as it might be implemented in a computer program. In the interest of clarity, not all features of an actual implementation are described in this specification. In the development of any such actual implementation, numerous programming decisions must be made to achieve the developers' specific goals (e.g., acceptable levels of output accuracy, detection or discrimination of particular objects made of certain materials or of certain shapes, penetration depth), which will vary from one implementation to another. It thus will be appreciated that such a development effort could be expected to be complex and time consuming, but would nevertheless be a routine undertaking of program development for those of ordinary skill having the benefit of this disclosure and knowledge of the functions described herein.

Figure 4:
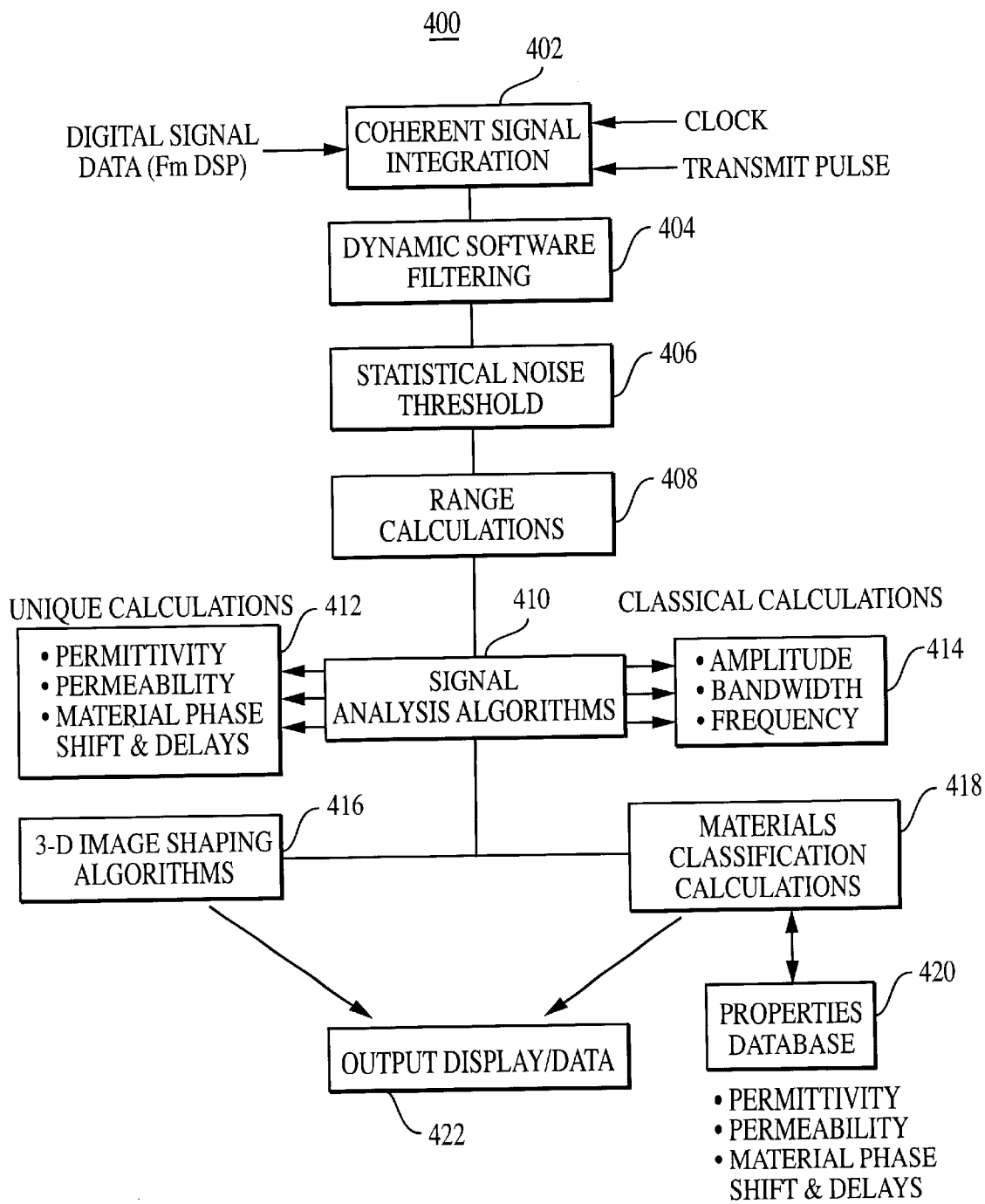
FIG. 4 is a flow diagram of a method of signal processing and material identification performed by the radar of FIG. 3.

A method of signal processing and materials identification of the radar constructed as described above will be now be described with reference to the flow diagram of FIG. 4. All steps can be performed by the processing unit 320, but a skilled artisan will recognize that the steps can equivalently be performed by other elements of the radar.

Coherent signal integration is used to maximize the amplitude of multiple pulse signal returns that are at or below the noise floor. (Step 402 and 406.) Pulse repetition rate and pulse width are controlled to ensure sufficient data is obtained to image and classify the target Dynamic software filtering is used to provide discrete "binning" of the broad-band input data. (Step 404.) The discrete bins are then individually analyzed for signal content and classification, thus aiding more rapid data processing and target recognition.

Initial signal processing, including range calculations, is performed using classically tailored methodologies for signal processing. (Step 408.)

Signal analysis algorithms calculate the amplitude, bandwidth, and frequency of the stored processed reflected wave using classically tailored methodologies for signal processing and calculate the permittivity, permeability, phase shift, and delay. (Steps 410–414.)

3-D image shaping algorithms generate an output reflecting the image of the subsurface area of interest. (Step 416.)

Material classification algorithms generate an output reflecting the identification of the material composition of subsurface objects. (Step 418.) The material classification algorithms use the stored permittivity, permeability, phase shift, and delay of each of the subsurface objects in making the identification. (Step 420.)

The image of the subsurface area of interest or the identification of the material composition of subsurface objects or both are displayed. (Step 422.)

Figure 5:
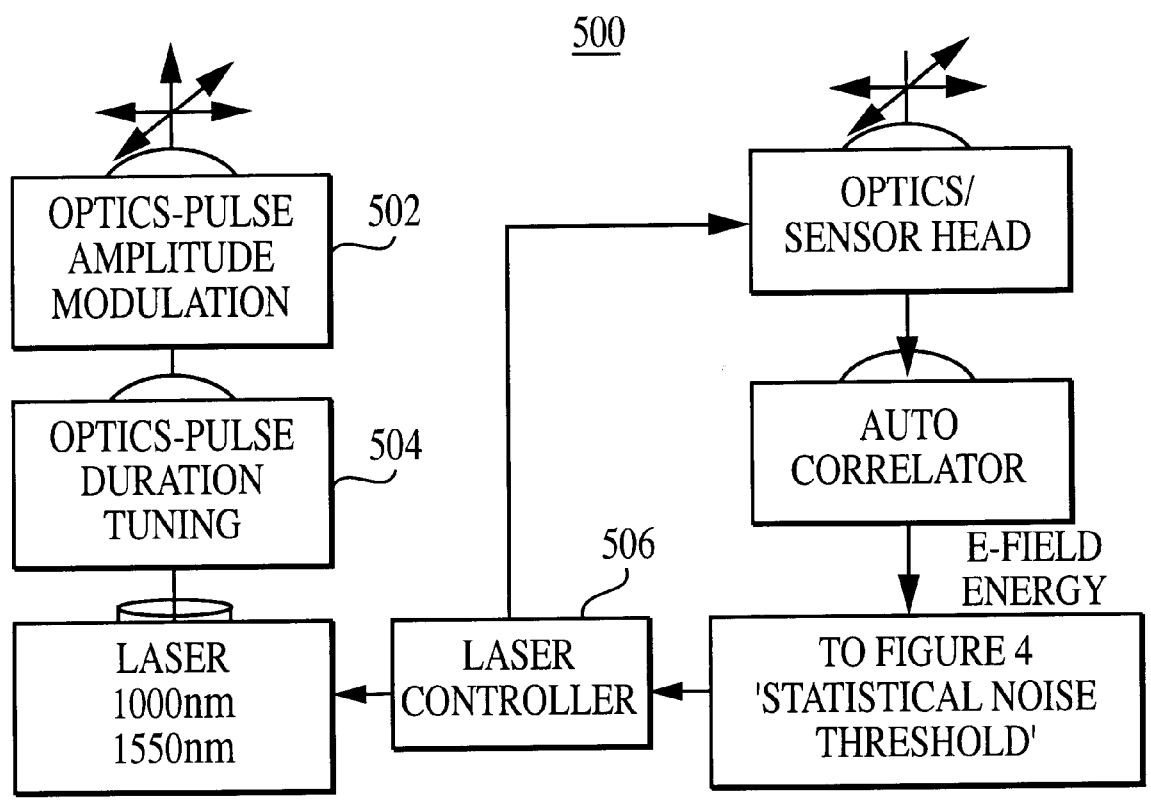
FIG. 5 is a functional block diagram of laser pulse transceiver configured according to the present invention.

Those skilled in the art will recognize that other modifications and variations can be made in the radar of the present invention and in construction and operation of this radar without departing from the scope or spirit of this invention. For example, a laser pulse transceiver 500 as shown in FIG. 5, can be used instead of a radio-frequency pulse transceiver. The laser pulse transceiver transmits pulses in the laser frequency range of the frequency spectrum using coherent electromagnetic radiation. This allows the use of much shorter pulse durations and more finite control of pulse amplitude, for example, sub-picosecond pulse durations. At sufficiently short pulse duration and quantized amplitudes, lasers begin non-destructive penetration of solid material. The finer pulse duration and amplitude control aids in discriminating between masses of nearly the same density and chemical structure, achieving higher power devices with extended range capabilities, and enhancing resolution. Laser systems further extend operating applications through extended range capabilities (Pulse Amplitude Modulation 502 and Pulse Duration Tuning 504), the ability to dynamically and simultaneously control pulse duration and amplitude (Laser Controller 506); and finer resolution of materials with similar mass densities and chemical structures (Signal Processing Interface as depicted in FIG. 4).

It will be appreciated by those of ordinary skill having the benefit of this disclosure that the invention can be similarly implemented for other uses beyond those described above. Applications of this invention apply to areas of technology where electromagnetics, imaging, or material identification are involved. This technology will impact many disciplines, from medical imaging, geophysical surveying, etc., to ocean exploration. Specific areas of immediate application are the detection and discrimination of land mines in all weather conditions, agricultural surveys, construction inspection, and oil/gas exploration. Compared to prior and existing art, the invention applied to these areas promises to be cheaper, faster, and more reliable. The hardware configurations, advanced real-time broadband software processing, and optimized operations using dynamic variable pulse sequences will be application unique.

Unique operational waveforms for radar and communications applications can be designed. Currently classical penetrating radar is incapable of this. In fact, the signal-to-noise optimization process defines the use of RF generators or lasers, and dramatically reduces the spurious reflections and fuzziness of current approaches. The derived sequences of varying pulse sequences optimize detection and imagery of selected targets. The uniqueness of these sequences of electromagnetic transient pulses allow for greater discrimination of imagery for each specific application.

In summary, this invention will provide high-resolution 3-dimensional images of structures deeply buried or hidden behind barriers, under harsh environmental conditions, the quality of imaging being a function of N sequences of pulse durations, amplitudes, and shapes, specific to media composition and extent. Furthermore, this invention will classify or identify the material composition of the structures or objects. The imagery, resolution, and utility of this invention outstrip any current penetrating radar technology.

What is claimed is:

1. A radar comprising:
a transceiver for transmitting pulses directed to a subsurface area of interest and for receiving a reflected wave from the subsurface area of interest, the pulses have a pulse duration and amplitude constrained by the equation, $$d^2|E|e/m \leq 1 \text{ Angstrom},$$

where d is the pulse duration in seconds, E is the pulse amplitude in volts/meter, e equals the charge of an electron in Coulombs, and m equals the mass of an electron in Kg; and a processing device, in communication with the transceiver, for displaying an image of the subsurface area of interest based upon the reflected wave.

2. The radar of claim 1, wherein the processing device controls the selection of the pulse duration and amplitude to enhance the image of the subsurface area of interest.

3. The radar of claim 1, wherein the processing device identifies the material composition of a plurality of subsurface objects based upon the reflected wave and known properties of the plurality of subsurface objects that vary as a function of the pulse duration and amplitude.

4. The radar of claim 3, wherein the known properties include permittivity, permeability, phase shift, and delay.

5. The radar of claim 3, wherein the processing device controls the selection of the pulse duration and amplitude to enhance the identification of the material composition of the plurality of subsurface objects.

6. The radar of claim 1, wherein the pulses are in the radio-frequency range of the frequency spectrum.

7. The radar of claim 1, wherein the pulses are in the laser-frequency range of the frequency spectrum.

8. The radar of claim 1, wherein the pulses are coherent electromagnetic radiation.

9. The radar of claim 1, wherein the processing device includes:
   a signal processor for processing the reflected wave;
   a memory device, in communication with the signal processor, for storing the processed reflected wave and known properties of a plurality of subsurface objects, wherein the known properties of the plurality of subsurface objects vary as a function of the pulse duration and amplitude;
   a processing unit, in communication with the memory device, for providing an output based upon the stored processed reflected wave and known properties of the plurality of subsurface objects corresponding to the pulse duration and amplitude of the transmitted pulses; and
   a display device for displaying the output provided by the processing unit, wherein the displayed output identifies the material composition of the plurality of subsurface objects.

10. The radar of claim 9, wherein the processing unit dynamically software filters the stored processed reflected wave to provide discrete binning of the stored processed reflected wave, wherein the processing unit individually analyzes the bins in providing the output based upon the stored processed reflected wave and the known properties of the plurality of subsurface objects.

11. A radar comprising:
    a transceiver for transmitting pulses of variable pulse duration and amplitude directed to a subsurface area of interest and for receiving a reflected wave from the subsurface area of interest;
    a processing device, in communication with the transceiver, for identifying the material composition of a plurality of subsurface objects based upon the reflected wave and known properties of the plurality of subsurface objects that vary as a function of the pulse duration and amplitude.

12. The radar of claim 11, wherein the pulses have a pulse duration and amplitude constrained by the equation, $$d^2 |E| e/m \leq 1 \text{ Angstrom,}$$

where d is the pulse duration in seconds, E is the pulse amplitude in volts/meter, e equals the charge of an electron in Coulombs, and m equals the mass of an electron in Kg.

13. The radar of claim 11, wherein the processing device controls the selection of the pulse duration and amplitude to enhance the identification of the material composition of the plurality of subsurface objects.

14. The radar of claim 11, wherein the processing device displays an image of the subsurface area of interest based upon the reflected wave.

15. The radar of claim 14, wherein the processing device controls the selection of the pulse duration and amplitude to enhance the image of the subsurface area of interest.

16. The radar of claim 11, wherein the pulses are in the radio-frequency range of the frequency spectrum.

17. The radar of claim 11, wherein the pulses are in the laser-frequency range of the frequency spectrum.

18. The radar of claim 11, wherein the pulses are coherent electromagnetic radiation.

19. The radar of claim 11, wherein the known properties include permittivity, permeability, phase shift, and delay.

20. A radar for exploring a subsurface area of interest, the radar comprising:
    a transceiver transmitting pulses directed to the subsurface area of interest and receiving a reflected wave from the subsurface area of interest, the pulses have a pulse duration and amplitude constrained by the equation, $$d^2 |E| e/m \leq 1 \text{ Angstrom,}$$

where d is the pulse duration in seconds, E is the pulse amplitude in volts/meter, e equals the charge of an electron in Coulombs, and m equals the mass of an electron in Kg; and
    a processing device, in communication with the transceiver, providing an output representing an image of the subsurface area of interest based upon the reflected wave.

21. The radar of claim 20 comprises a display device displaying the output provided by the processing device, wherein the displayed output is an image of the subsurface area of interest.

22. A radar for exploring a subsurface area of interest that includes a plurality of subsurface objects, the radar comprising:
    a transceiver transmitting pulses of variable pulse duration and variable amplitude directed to a subsurface area of interest and receiving a reflected wave from the subsurface area of interest; and
    a processing device, in communication with the transceiver, providing an output representing an identification of the material composition of the plurality of subsurface objects based upon the reflected wave and known properties of the plurality of subsurface objects that vary as a function of the pulse duration and amplitude.

23. The radar of claim 22 comprises a display device displaying the output provided by the processing device, wherein the displayed output identifies the material composition of the plurality of subsurface objects.

24. The radar of claim 22, wherein the pulses have a pulse duration and variable amplitude constrained by the equation, $$d^2 |E| e/m \leq 1 \text{ Angstrom,}$$

where d is the pulse duration in seconds, E is the pulse amplitude in volts/meter, e equals the charge of an electron in Coulombs, and m equals the mass of an electron in Kg.

25. A radar comprising:
    an impulse generator for generating a sequence of ultra-narrow pulses of variable pulse duration and amplitude, the pulses have a pulse duration and amplitude constrained by the equation, $$d^2 |E| e/m \leq 1 \text{ Angstrom,}$$

where d is the pulse duration in seconds, E is the pulse amplitude in volts/meter, e equals the charge of an electron in Coulombs, and m equals the mass of an electron in Kg;

a transmit antenna, in communication with the impulse generator, for transmitting the sequence of ultra-narrow pulses directed to a subsurface area of interest;

a receive antenna for receiving a reflected wave from the subsurface area of interest;

an impulse receiver, in communication with the receive antenna, for amplifying the reflected wave;

a signal processor, in communication with the impulse receiver, for processing the reflected wave;

a memory device, in communication with the signal processor, for storing the processed reflected wave and the permittivity, permeability, phase shift, and delay of a plurality of subsurface objects, wherein the permittivity, permeability, phase shift, and delay vary as a function of the pulse duration and amplitude;

a processing unit, in communication with the impulse generator, the impulse receiver, and the memory device, for controlling the pulse duration and amplitude of the sequence of ultra-narrow pulses, the transmission of the sequence of ultra-narrow pulses, and the reception of the reflected wave, and for providing an output based upon the stored processed reflected wave and the permittivity, permeability, phase shift, and delay associated with the subsurface objects and corresponding to the pulse duration and amplitude of the sequence of ultra-narrow pulses; and a display device, in communication with the processing unit, for displaying the output provided by the processing unit, wherein the displayed output images the subsurface area of interest and identifies the material composition of the plurality of subsurface objects.

26. A radar comprising:

means for transmitting pulses directed to a subsurface area of interest, the pulses have a pulse duration and amplitude constrained by the equation, $$d^2|E|e/m \leq 1 \text{ Angstrom,}$$

where d is the pulse duration in seconds, E is the pulse amplitude in volts/meter, e equals the charge of an electron in Coulombs, and m equals the mass of an electron in Kg;

means for receiving a reflected wave, from the subsurface area of interest; and means for providing an output representing an image of the subsurface area of interest based upon the reflected wave.

27. The radar of claim 26, wherein the means for providing an output comprises means for displaying the output, wherein the displayed output is an image of the subsurface area of interest.

28. A radar comprising:

means for transmitting pulses of variable pulse duration and variable amplitude directed to a subsurface area of interest;

means for receiving a reflected wave from the subsurface area of interest; and means for providing an output representing an identification of the material composition of a plurality of subsurface objects based upon the reflected wave and known properties of the plurality of subsurface objects that vary as a function of the pulse duration and amplitude.

29. The radar of claim 28, wherein the means for providing an output comprises means for displaying the output, wherein the displayed output identifies the material composition of the plurality of subsurface objects.

30. The radar of claim 28, wherein the pulses have a pulse duration and amplitude constrained by the equation, $$d^2|E|e/m \leq 1 \text{ Angstrom,}$$

where d is the pulse duration in seconds, E is the pulse amplitude in volts/meter, e equals the charge of an electron in Coulombs, and m equals the mass of an electron in Kg.

31. A method comprising:

transmitting pulses directed to a subsurface area of interest, the pulses have a pulse duration and amplitude constrained by the equation, $$d^2|E|e/m \leq 1 \text{ Angstrom,}$$

where d is the pulse duration in seconds, E is the pulse amplitude in volts/meter, e equals the charge of an electron in Coulombs, and m equals the mass of an electron in Kg;

receiving a reflected wave from the subsurface area of interest; and providing an output representing the subsurface area of interest based upon the reflected wave.

32. The method of claim 31 further comprises displaying the output, wherein the displayed output is an image of the subsurface area of interest.

33. A method comprising:

transmitting pulses of variable pulse duration and variable amplitude directed to a subsurface area of interest;

receiving a reflected wave from the subsurface area of interest;

providing an output representing an identification of the material composition of a plurality of subsurface objects based upon the reflected wave and known properties of the plurality of subsurface objects that vary as a function of the pulse duration and amplitude.

34. The method of claim 33 further comprises displaying the output, wherein the displayed output identifies the material composition of the plurality of subsurface objects.

35. The method of claim 33, wherein the pulses have a pulse duration and amplitude constrained by the equation, $$d^2|E|e/m \leq 1 \text{ Angstrom,}$$

where d is the pulse duration in seconds, E is the pulse amplitude in volts/meter, e equals the charge of an electron in Coulombs, and m equals the mass of an electron in kilograms.

* * * * *